US006484190B1

(12) United States Patent
Cordes et al.

(10) Patent No.: US 6,484,190 B1
(45) Date of Patent: Nov. 19, 2002

(54) SUBSET SEARCH TREE INTEGRATED GRAPHICAL INTERFACE

(75) Inventors: Richard Edward Cordes, Chapel Hill; George E. Hall, Jr., Hillsborough; David Bruce Lection, Raleigh, all of NC (US); Anthony Edward Martinez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/108,431

(22) Filed: Jul. 1, 1998

(51) Int. Cl.[7] .............................................. G06F 15/00
(52) U.S. Cl. ..................... 707/514; 707/513; 707/3; 707/4; 345/809; 345/853
(58) Field of Search ................. 707/514, 513, 707/3–6, 501.1; 345/809, 853

(56) References Cited

U.S. PATENT DOCUMENTS

| | | | | | |
|---|---|---|---|---|---|
| 5,600,826 A | * | 2/1997 | Ando | ......................... | 707/103 |
| 5,621,905 A | * | 4/1997 | Jewson et al. | .............. | 345/353 |
| 5,708,806 A | * | 1/1998 | DeRose et al. | ............. | 707/104 |
| 5,761,664 A | * | 6/1998 | Sayah et al. | ................ | 707/100 |
| 5,768,581 A | * | 6/1998 | Cochran | ......................... | 707/5 |
| 5,790,121 A | * | 8/1998 | Sklar et al. | .................. | 345/356 |
| 5,801,702 A | * | 9/1998 | Dodan et al. | ................ | 345/357 |
| 5,812,123 A | * | 9/1998 | Rowe et al. | ................ | 345/327 |
| 5,815,155 A | * | 9/1998 | Wolfston, Jr. | ............... | 345/357 |
| 5,819,258 A | * | 10/1998 | Vaithyanathan et al. | ....... | 707/2 |
| 5,838,965 A | * | 11/1998 | Kavanagh et al. | .......... | 395/614 |
| 5,870,739 A | * | 2/1999 | Davis, III et al. | .............. | 707/4 |
| 5,953,718 A | * | 9/1999 | Wical | ............................ | 707/5 |
| 5,963,208 A | * | 10/1999 | Dolan et al. | ................. | 345/357 |
| 6,028,602 A | * | 2/2000 | Weidenfeller et al. | ....... | 345/340 |
| 6,038,560 A | * | 3/2000 | Wical | ............................ | 707/5 |
| 6,115,044 A | * | 9/2000 | Alimpich et al. | ........... | 345/855 |
| 6,199,098 B1 | * | 3/2001 | Jones | ......................... | 709/203 |
| 6,202,199 B1 | * | 3/2001 | Wygodny et al. | ........... | 702/183 |
| 6,236,987 B1 | * | 5/2001 | Horowitz et al. | .............. | 707/3 |
| 6,341,280 B1 | * | 1/2002 | Glass et al. | ................... | 707/10 |
| 6,347,320 B1 | * | 2/2002 | Christensen et al. | ........... | 707/1 |
| 6,360,332 B1 | * | 3/2002 | Weinberg et al. | ............. | 714/38 |

OTHER PUBLICATIONS

Microsoft Corporation, Microsoft Windows NT, Version 4.0, 1998, screenprints, pp. 1–4.*

Microsoft Windows, Proxima SSO, Microsoft Corporation, 1990–1995, screen printouts, pp. 1–3.*

* cited by examiner

Primary Examiner—Stephen S. Hong
Assistant Examiner—Cong-Lac Huynh
(74) Attorney, Agent, or Firm—Jeanine S. Ray-Yarletts; Marcia L. Doubet (57) ABSTRACT

An efficient and intuitive means, method and apparatus for displaying and searching information organized in a hierarchical manner. The presented method for displaying and searching information utilizes methods residing at the nodes of the hierarchically organized information.

11 Claims, 10 Drawing Sheets

SUBSET SEARCH TREE INTEGRATED GRAPHICAL INTERFACE

BACKGROUND OF THE INVENTION

Figure 1:
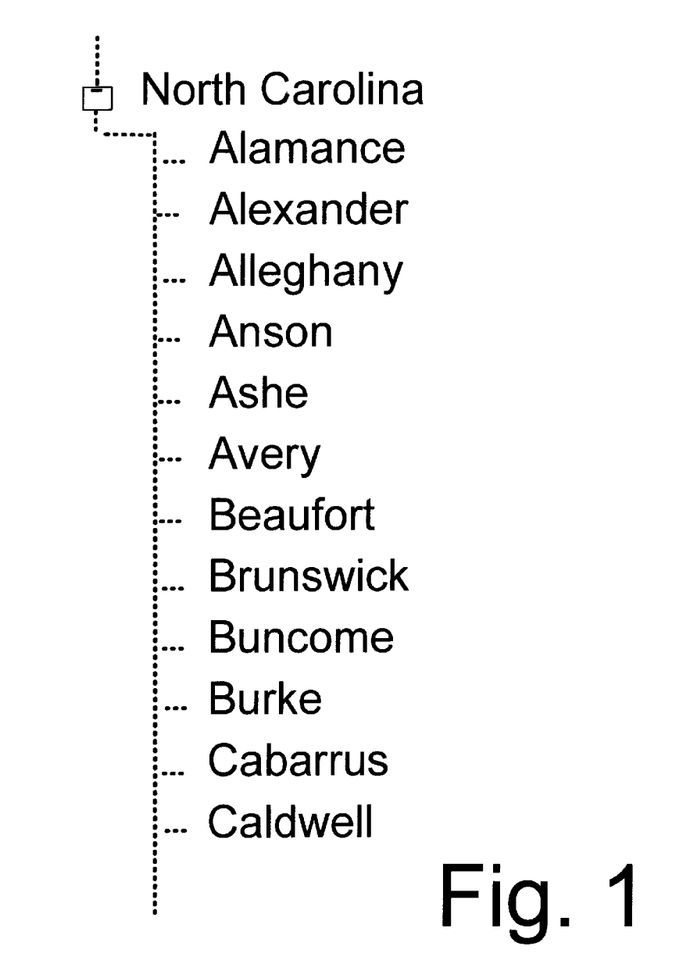
FIG. 1 is an example of information stored within a tree structure.

Much of the information presented to computer users today is presented using a tree structure. A tree structure, when referring to a computer user interface, is a structure where groups are associated with entities within the groups which may be associated with even more refined entities within a group. It provides a hierarchical view of a collection of information. An example of this would be a tree structure (a part of which is shown in FIG. 1) where the countries of the world are listed, each country containing its associated states, each state containing its associated counties and each county having its associated towns. As shown in FIG. 1 when looking at North Carolina, much of the tree is not visible on the screen due to the substantial amount of information contained within the tree.

A large percentage of network management programs today are required to be scalable. In order to manage a large number of users with respect to different applications, the applications must group users and networks in some form of hierarchy. The hierarchy is typically mapped on to the tree display for the user of the program. As seen in FIG. 1, as the number of users and information in the tree increase, the tree becomes difficult to view, search and manage. Simple search mechanisms are typically offered and these have limited use for finding simple strings within the data. There are no known methods or systems for providing a contextual search within the hierarchy of a tree. A need exists for an uncomplicated method to subset and display hierarchical information to a user without significantly increasing the screen clutter and requiring significant amounts of screen space.

OBJECTS OF THE INVENTION

In view of the above, it is an object of the present invention to provide an efficient means for searching hierarchically organized information. It is another object of the present invention to minimize the screen utilization introduced by this searching mechanism. It is yet another objective to provide means for the user to receive additional information or assistance in the searching without requiring additional screen space. It is yet another object of the present invention to enable the user to fold levels of information that are currently uninteresting without disturbing the association with parent nodes.

SUMMARY OF THE INVENTION

The present invention achieves the foregoing objects by providing a method, system and program product for searching hierarchical trees more effectively. The hierarchical set of information has at least three pieces of information contained at each node of the tree. The three components are (1) the data contained at the node (2) a text entry field for a subset key for the node, and (3) the count of children for the node. This enables more efficient searching and reporting of the information contained within the hierarchical structure.

DETAILED DESCRIPTION OF THE PREFERRED EMBODIMENT

The present invention will now be described in greater detail with respect the figures and a preferred embodiment. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining hardware and software. Furthermore, the present invention may take the form of a computer program product on a computer-readable storage medium having computer-readable program code means embodied on the medium. Any computer readable medium, including disk drives, CD-ROMs, optical storage devices, magnetic storage devices or storage medium of the world wide web are applicable.

The preferred embodiment of the present invention is implemented using object oriented design such that the control does not process a key that is to be searched directly. When the key value changes, the control calls a method at the node of the tree to have the method determine the count of children that match the new or changed key. This allows great flexibility in matching the keys using any criteria desired. This also enables the use of wildcard characters and allows for contextual searching to be done. When the key is entered at a node, the key is passed to the node's keyCheck method. The method uses the new key value to determine the number of nodes that match the key and are therefore in the subset. This is done at each of the nodes rather than being stored in a centralized location. Examples of searches are an empty key, which may depict either all nodes in the subset or no nodes in the subset depending on programmer preferences; "char(s)*" which would depict any string beginning with the specified characters; "*char(s)" which would depict any string ending with the specified characters; or "*char(s)*" which would depict any string containing the specified characters. This syntax is customizable by the programmer and is not limited to or restricted by the above examples.

Figure 2A:
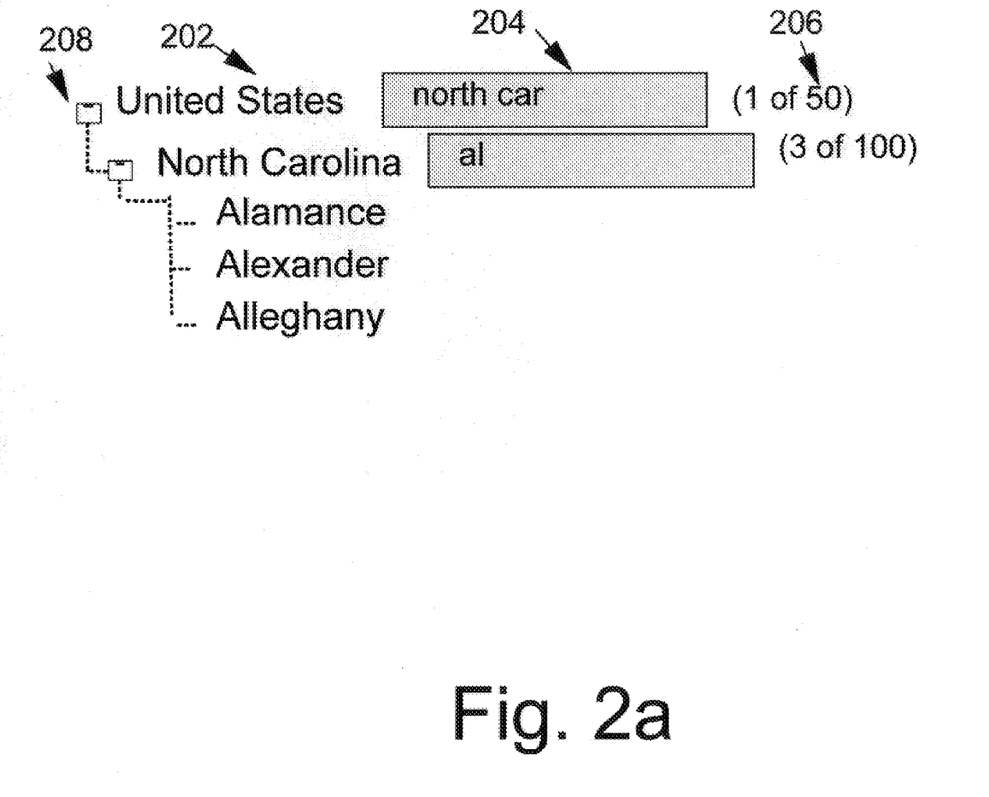
FIG. 2a is an example of the subset search tree control of the present invention having three tiers.

FIG. 2a depicts a subset tree control utilizing the present invention. The example depicts a search of states contained within the United States, the states within the U.S. and the counties contained therein being the hierarchical structure 202. The searcher entered "north car" as the search string into the search field 204, which resulted in North Carolina being the only state that matched the criteria. The status indicator 206 on the right of the search field indicates that only one of the fifty entries for the United States matched the search criteria. The "−" within the box to the left of the United States 208 indicates that this node of the tree can be collapsed. If the field were completely collapsed and there was information available for expansion the box would contain a "+" in the preferred embodiment of the present invention. Continuing downward in FIG. 2a, the user then chooses to search for the counties in North Carolina which begin with the letters "al", in North Carolina there are three, Alamance, Alexander, and Alleghany which are displayed in a hierarchical manner subordinate to North Carolina and the status indicator for that search indicates that there are 100 counties in North Carolina, three of which match the search criteria.

Figure 2B:
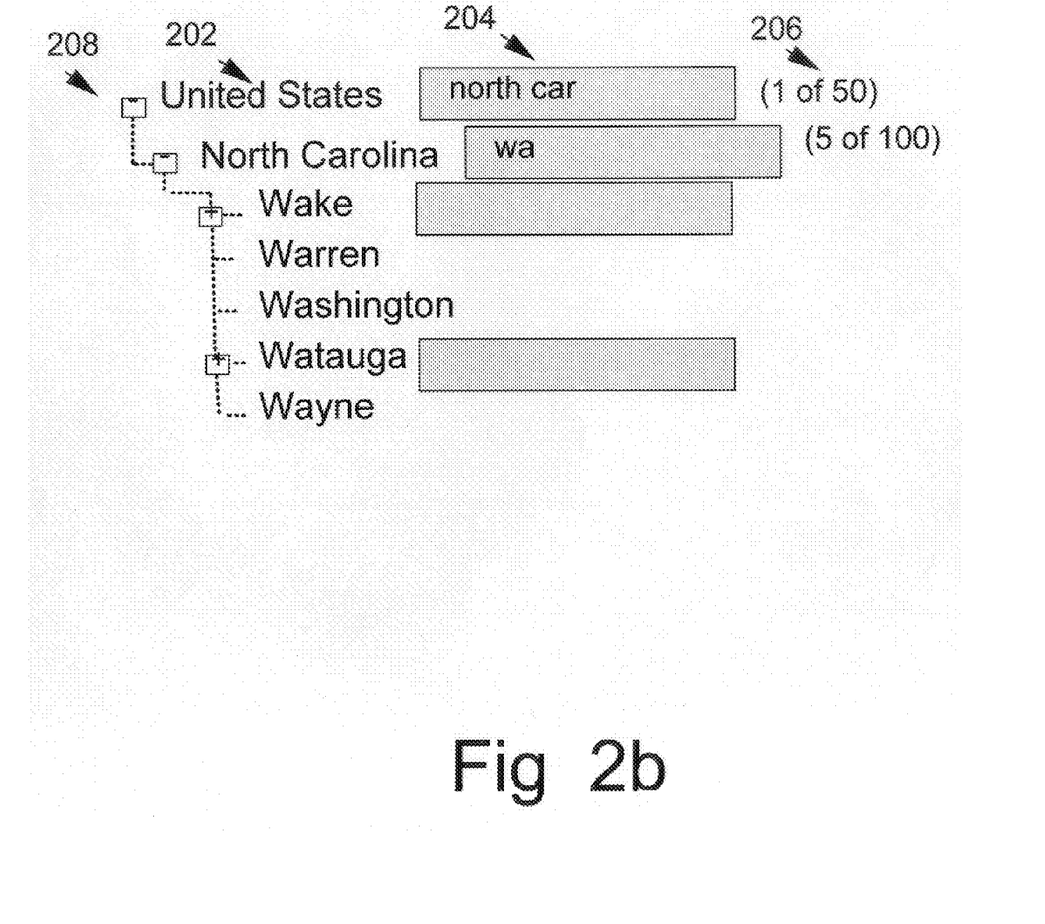
FIG. 2b is an example of the subset search tree control of the present invention depicting further information available at the nodes.
Figure 2C:
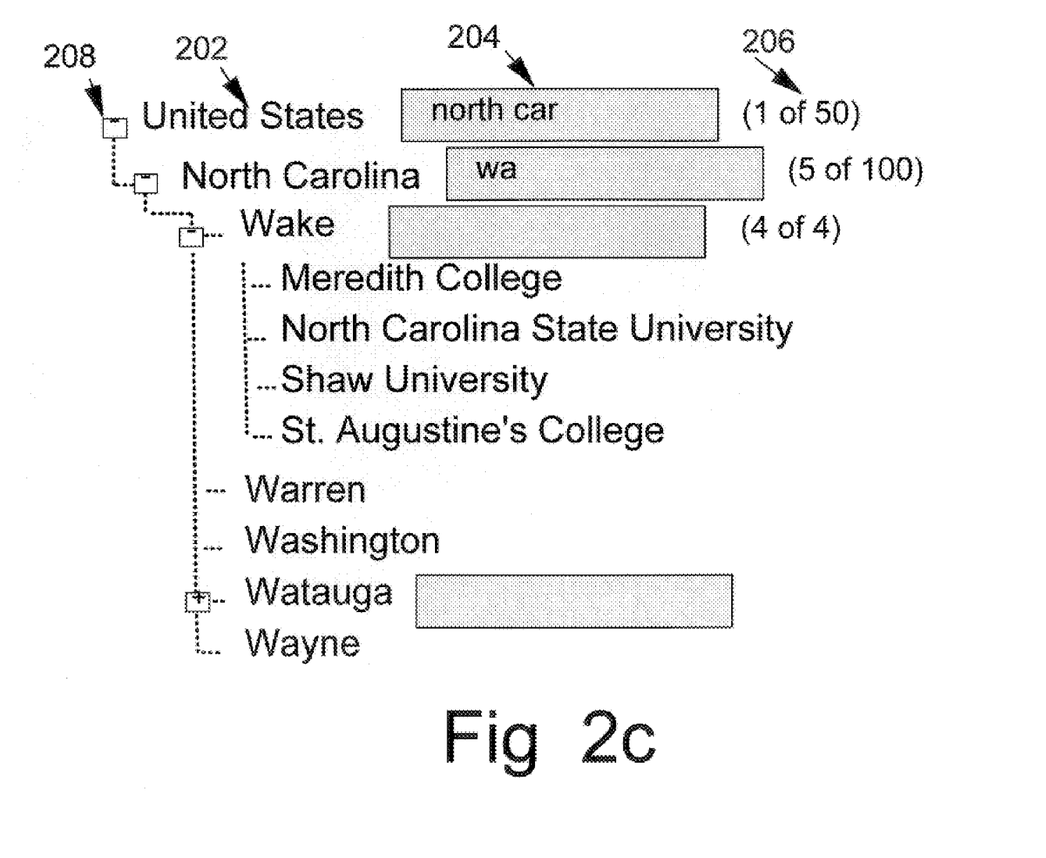
FIG. 2c is an example of the subset search tree control of the present invention having four tiers with some of the fourth tier expanded.

FIG. 2b indicates a search of the United States where again, the user was searching for North Carolina, but this time the user entered the search criteria "wa" in the search for the counties. The status indicator 206 indicates that five of the 100 counties in North Carolina match this criteria. The counties that match this criteria are Wake, Warren, Washington, Watauga and Wayne. The "+" indication in the box next to Wake and Watauga counties indicate that there is further subordinate information that can be expanded in those counties. In our particular example we are searching for colleges in North Carolina. FIG. 2c depicts the expansion of the "Wake" item in the hierarchy. This could be accomplished, for instance, by placing the pointer over the "+" in the box next to "Wake" 209 and clicking on that box. In the preferred embodiment of the present invention, this would expand the contents of the "Wake" item. Since there was no search criteria placed into the search field, the entire list is shown which is indicated by "(4 of 4)" in the status field. An alternative to allow the user to view the entire contents of the list would be to use a wild-card indicator, such as a "*", to indicate the desire to view the entire list.

Figure 3A:
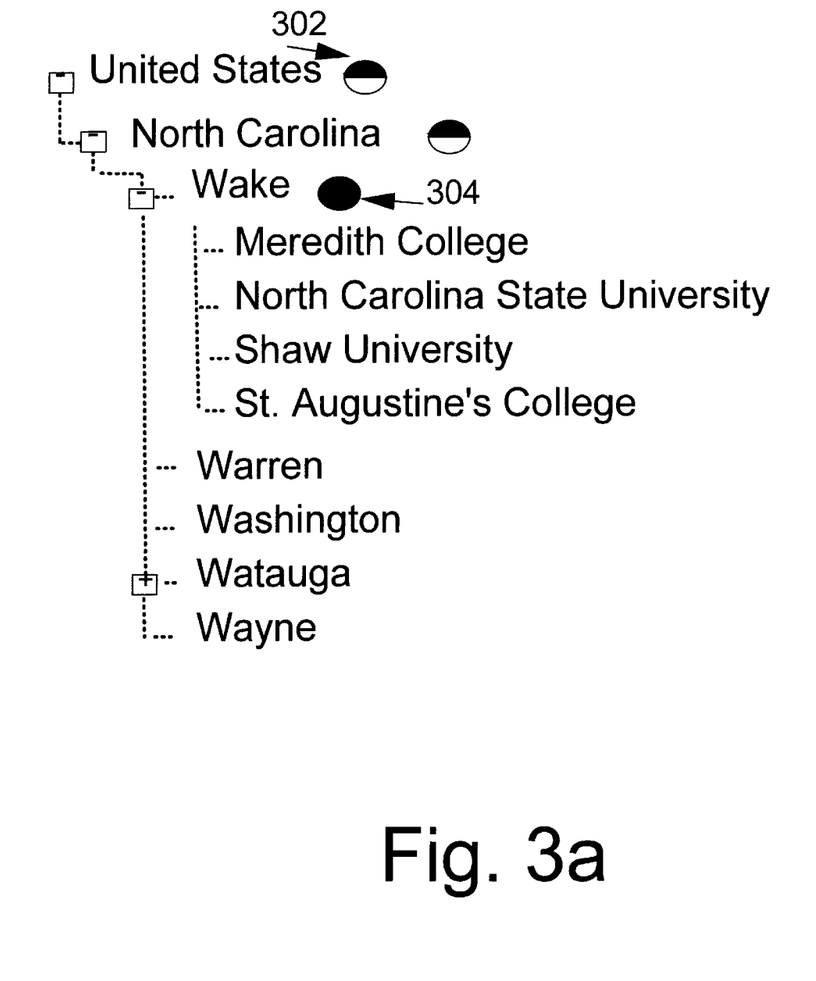
FIGS. 3a through 3c are alternative examples of depicting the subset search tree control.

FIG. 3a depicts an alternative means of accomplishing the same type of searching yet further conserving screen space. In FIG. 3a, an indicator (in the preferred embodiment, circles such as are used for Consumer's Reports Customer Satisfaction Indicator Ratings but this could be any visual representation) is used to tell the user whether part of the information is displayed or all of the information is displayed. If a partially full circle 302 is displayed, this indicates that only some of the available information has been presented. If a solid circle 304 is displayed, this indicates that all of the available information is presented to the user. This conserves screen space and screen clutter while conveying the most critical of the information to the user.

Figure 3B:
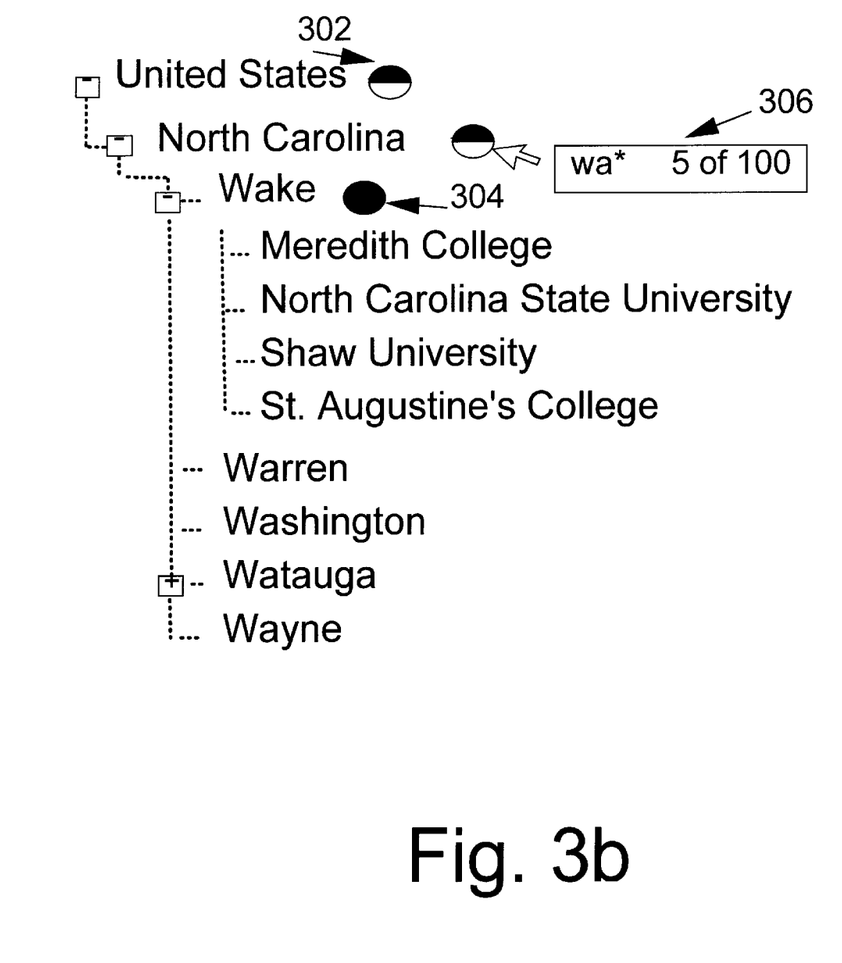

FIG. 3b further refines the alternative of FIG. 3a in that FIG. 3b utilizes a form of balloon help or balloon activation. In this instance, if the user places the cursor over the partially full circle and indicates activation as with a click, information containing the details of the search are expanded 306. In the example of FIG. 3b, the search used was "wa*" and the results were the display of 5 of the 100 counties in North Carolina.

Figure 3C:
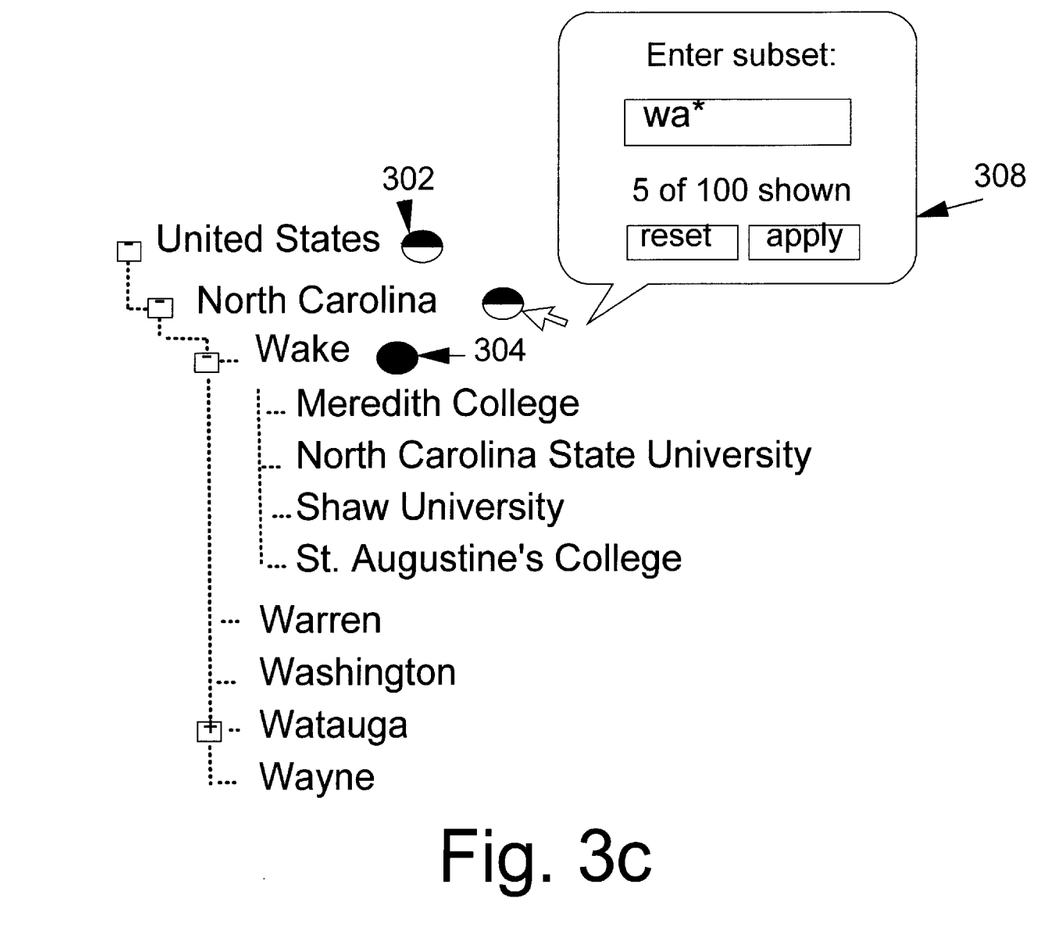

FIG. 3c depicts a balloon-type activation where, when the user places the cursor over the partially or completely filled circle, a window 308 is displayed showing the user the search criteria and allowing the user to modify or apply a new search. It also displays statistics of the results.

Figure 4A:
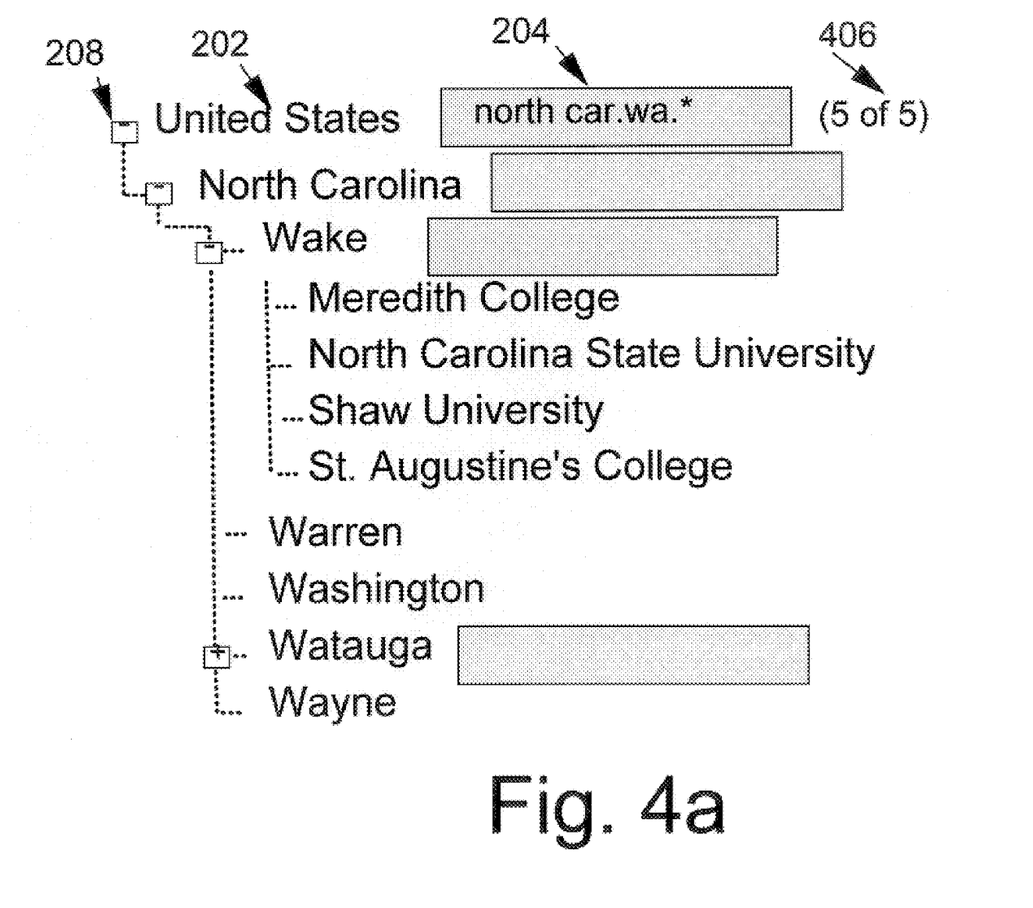
FIG. 4a depicts a fast-path subset selection of the present invention.

FIG. 4a is an example of fast-path searching 402 where the user uses a delimiter, in the preferred embodiment a period, to separate the fields for the levels of searching and they enter the entire search into a single search field input. This allows the user to reduce the number of key strokes and mouse clicks while still viewing the searchable selections.

Figure 4B:
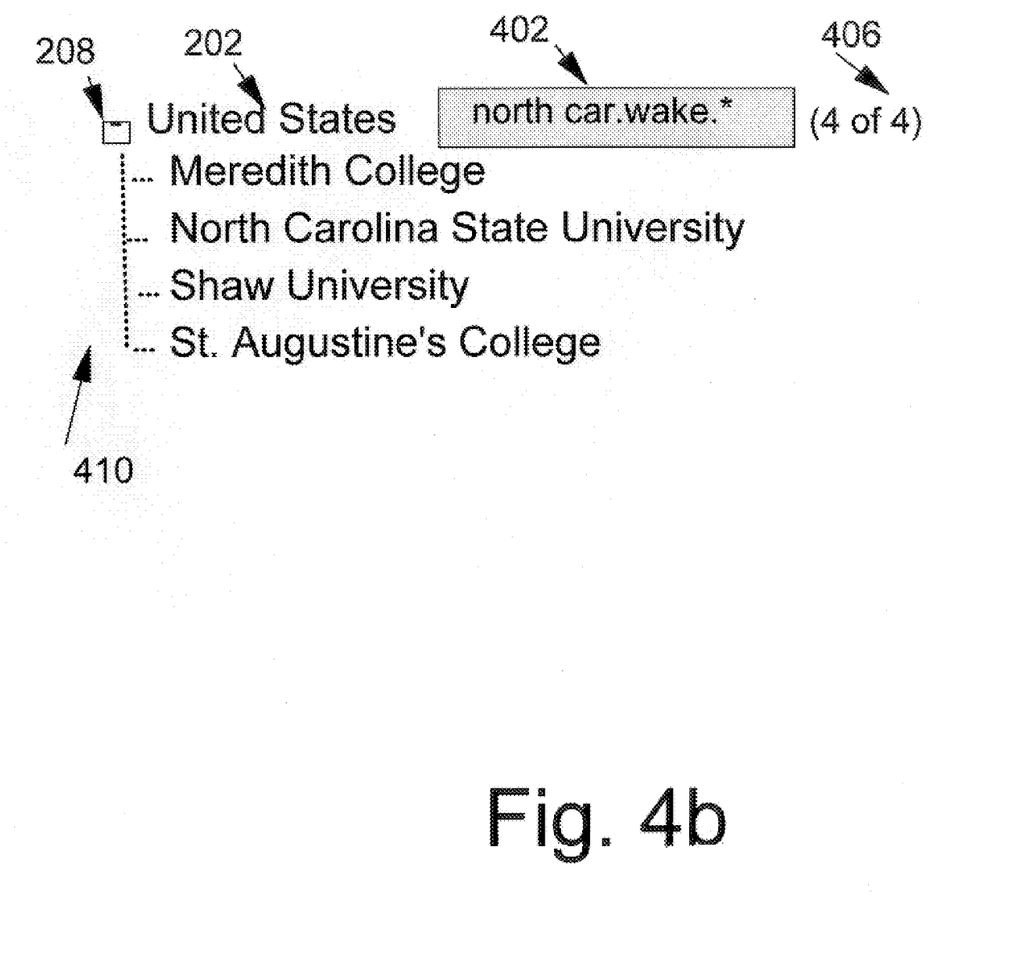
FIG. 4b depicts a folded mode implemented in the present invention.

FIG. 4b depicts what is referred to in the present invention as a "folded mode". In several hierarchical structures, the information is segmented and stored in several layers. As a user goes through these layers, the information can easily be presented off of the right edge of the screen so that the user will be forced to scroll back and forth to comprehend the information. The preferred embodiment of the present invention implements a folded mode so that the user may, by a predefined set of key strokes, collapse the view such that only the root and the ultimate final results of the search are displayed 410. In the preferred embodiment, this is implemented as a toggle so that the user may then "unfold" the information using the same key strokes. This enhancement to the present invention significantly reduces the amount of display device real estate required for multi-tiered searches.

A further enhancement to the present invention would be to implement thresholds on the subset searching. This would require that a control be programmed to allow the node to show a subset of its subset of children only when some subset threshold has been met. As the user enters a subset key and the count of matching nodes drops below the threshold value, the subset of items would be enabled for display such as by enabling or darkening the indicator allowing the user to expand the information. If the user enters a subset key and the count of the matching nodes exceeds the threshold value, an indication of some kind, such as greying the handle, would be presented to the user so that they could further refine their search. Similar techniques are used in advanced searching engines such as Lexis-Nexis to allow only a manageable amount of information to be retrieved.

Figure 5A:
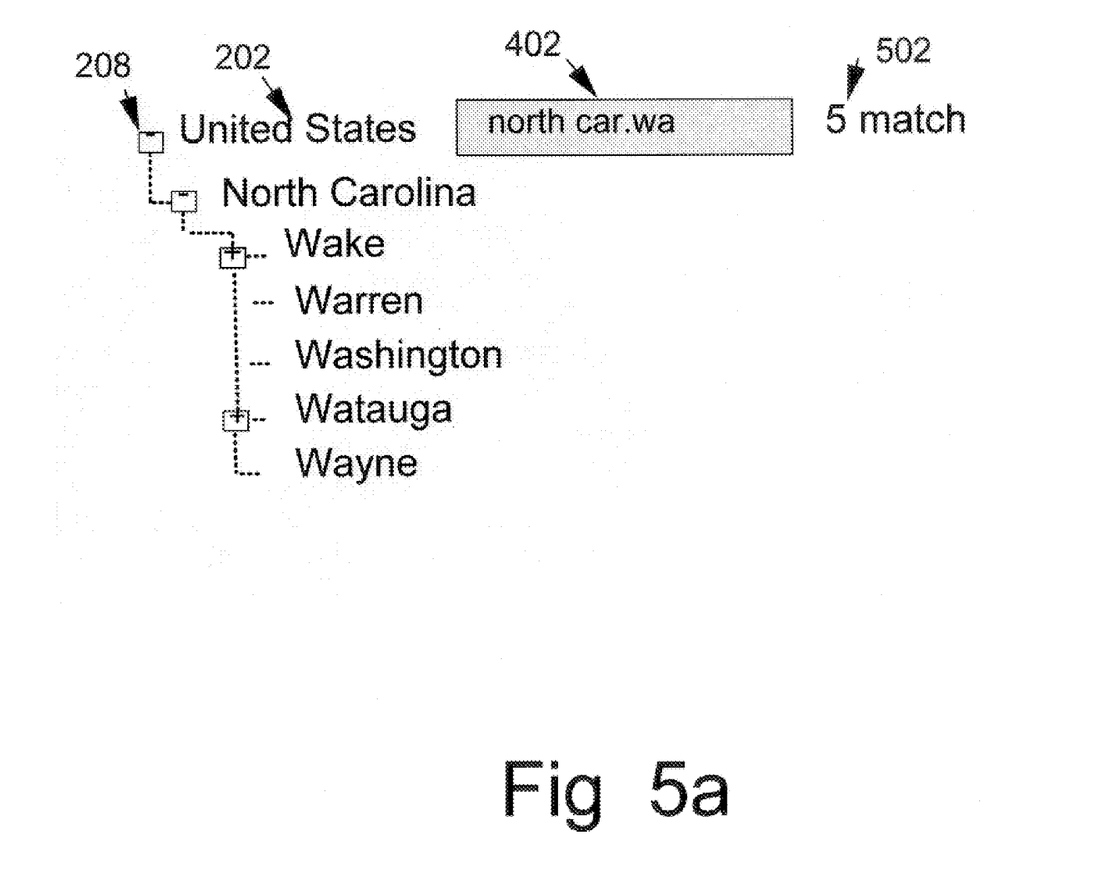
FIG. 5a depicts an alternative information display for the present invention.

Yet another modification to the present invention is an implementation such that the user is not shown the total number of items within the hierarchy. This would result in only the number of items matching the search criteria being displayed as shown in 502 of FIG. 5a. The top most node would segment the search key and pass the appropriate values of the key to the appropriate nodes. The nodes would recursively process the key and pass the result to the top most node for presentation to the user. Only the top most node and the ultimate search results would be shown with all intermediate nodes being in folded mode.

A further modification to the present invention is to allow the subsetting to be turned on or turned off. This can be done on a per node basis, for example, to enable the creator of a hierarchy to prohibit subsetting on certain levels which are believed to be critical for understanding the information presented.

What is claimed is:

1. A graphical method for searching a hierarchical information structure and for indicating results of said searching using a tree structure on a display device, said hierarchical information structure having more than one hierarchical level wherein each level has at least one node, said method comprising steps of:

displaying each hierarchical level of said hierarchical information structure at a different level of indentation in said tree structure on said display device, wherein subordinate levels of said hierarchical information structure are indented in said tree structure from superior levels;

displaying two or more search fields, wherein each of said displayed search fields is associated with a different one of said displayed hierarchical levels and is displayed in a presentation space adjacent to said displayed hierarchical level in said tree structure;

entering, by a user, search criteria into a selected one of said displayed search fields, wherein said selected one is associated with a particular one of said displayed hierarchical levels;

processing said entered search criteria by searching for occurrence of said entered search criteria within said hierarchical levels which are subordinate to said particular displayed hierarchical level;

displaying to said user a number of said hierarchical levels matching said entered search criteria; and displaying to said user only said hierarchical levels matching said entered search criteria.

2. The graphical method as claimed in claim 1, wherein a visual metaphor connects each of said displayed hierarchical levels, wherein said visual metaphor has a means for expanding a visual representation of said subordinate levels to show the hierarchical levels contained therein and for collapsing the visual representation of said subordinate levels so that the hierarchical levels contained therein are not displayed to said user.

3. A graphical method for searching a hierarchical information structure and for indicating results of said searching using a tree structure on a display device, said hierarchical information structure having more than one hierarchical level wherein each level has at least one node, said method comprising steps of:

displaying each hierarchical level of said hierarchical information structure at a different level of indentation in said tree structure on said display device, wherein subordinate levels of said hierarchical information structure are indented in said tree structure from superior levels;

displaying an indicator associated with each of one or more of said displayed hierarchical levels, said indicator informing a user if there is information which is not being displayed in the hierarchical level subordinate to the level with which the indicator is associated;

displaying a search entry field, responsive to the user placing a pointing device on a selected indicator;

accepting search criteria from said user in said displayed search entry field;

performing a search using the accepted search criteria by searching for occurrence of said accepted search criteria within said hierarchical levels which are subordinate to the displayed hierarchical level with which said selected indicator is associated; and displaying the subordinate hierarchical levels matching the accepted search criteria.

4. A system having a graphical means for searching a hierarchical information structure and for indicating results of said searching using a tree structure on a display device, said hierarchical information structure having more than one hierarchical level wherein each level has at least one node, said system comprising:

a display device;

an input device;

means for displaying each hierarchical level of said hierarchical information structure at a different level of indentation in said tree structure on said display device, wherein subordinate levels of said hierarchical information structure are indented in said tree structure from superior levels;

means for displaying two or more search fields, wherein each of said displayed search fields is associated with a different one of said displayed hierarchical levels and is displayed in a presentation space adjacent to said displayed hierarchical level in said tree structure;

means for entering, by a user, search criteria into a selected one of said displayed search fields, wherein said selected one is associated with a particular one of said displayed hierarchical levels;

means for processing said entered search criteria by searching for occurrence of said entered search criteria within said hierarchical levels which are subordinate to said particular displayed hierarchical level;

means for displaying to said user a number of said hierarchical levels matching said entered search criteria; and means for displaying to said user only said hierarchical levels matching said entered search criteria.

5. The system as claimed in claim 4, wherein a visual metaphor connects each of said displayed hierarchical levels, wherein said visual metaphor has a means for expanding a visual representation of said subordinate levels to show the hierarchical levels contained therein and for collapsing the visual representation of said subordinate levels so that the hierarchical levels contained therein are not displayed to said user.

6. A system having a graphical means for searching a hierarchical information structure and for indicating results of said searching using a tree structure on a display device, said hierarchical information structure having more than one hierarchical level wherein each level has at least one node, said system comprising:

means for displaying each hierarchical level of said hierarchical information structure at a different level of indentation in said tree structure on said display device, wherein subordinate levels of said hierarchical information structure are indented in said tree structure from superior levels;

means for displaying an indicator associated with each of one or more of said displayed hierarchical levels, said indicator informing a user if there is information which is not being displayed in the hierarchical level subordinate to the level with which the indicator is associated;

means for displaying a search entry field, responsive to the user placing a pointing device on a selected indicator;

means for accepting search criteria from said user in said displayed search entry field;

means for performing a search using the accepted search criteria by searching for occurrence of said accepted search criteria within said hierarchical levels which are subordinate to the displayed hierarchical level with which said selected indicator is associated; and means for displaying the subordinate hierarchical levels matching the accepted search criteria.

7. Computer readable program code having a graphical means for searching a hierarchical information structure and for indicating results of said searching using a tree structure on a display device, said hierarchical information structure having more than one hierarchical level wherein each level has at least one node, comprising:

computer readable program code means for displaying each hierarchical level of said hierarchical information structure at a different level of indentation in said tree structure on said display device, wherein subordinate levels of said hierarchical information structure are indented in said tree structure from superior levels;

computer readable program code means for displaying two or more search fields, wherein each of said displayed search fields is associated with a different one of said displayed hierarchical levels and is displayed in a presentation space adjacent to said displayed hierarchical level in said tree structure;

computer readable program code means for entering, by a user, search criteria into a selected one of said displayed search fields, wherein said selected one is associated with a particular one of said displayed hierarchical levels;

computer readable program code means for processing said entered search criteria by searching for occurrence of said entered search criteria within said hierarchical levels which are subordinate to said particular displayed hierarchical level;

computer readable program code means for displaying to said user a number of said hierarchical levels matching said entered search criteria; and computer readable program code means for displaying to said user only said hierarchical levels matching said entered search criteria.

8. Computer readable program code as claimed in claim 7, wherein a visual metaphor connects each of said displayed hierarchical levels, wherein said visual metaphor has a means for expanding a visual representation of said subordinate levels to show the hierarchical levels contained therein and for collapsing the visual representation of said subordinate levels so that the hierarchical levels contained therein are not displayed to said user.

9. A graphical method of searching a hierarchical information structure and representing results of the searching, comprising steps of:

displaying two or more hierarchical levels of the hierarchical information structure on a display device;

displaying at least two search fields on the display device, wherein each displayed search field is associated with a particular one of the displayed hierarchical levels;

entering, by a user, a search term into a selected one of the displayed search fields, wherein the entered search term specifies a plurality of values, wherein the plurality of values is to be used for searching a corresponding plurality of hierarchically-adjacent levels which are subordinate to the particular one of the displayed hierarchical levels with which the selected search field is associated;

processing the entered search term by successively refining a search for occurrence of the specified plurality of values, wherein the successively refining starts from a top-most one of the hierarchically-adjacent levels and continues downward toward a bottom-most one of the hierarchically adjacent levels, wherein the top-most one is the hierarchical level which is subordinate to the particular one of the displayed hierarchical levels with which the selected search field is associated; and displaying to the user the hierarchically-adjacent subordinate levels which are located by the processing step.

10. A system for searching a hierarchical information structure and representing results of the searching, comprising:

means for displaying two or more hierarchical levels of the hierarchical information structure on a display device;

means for displaying at least two search fields on the display device, wherein each displayed search field is associated with a particular one of the displayed hierarchical levels;

means for entering, by a user, a search term into a selected one of the displayed search fields, wherein the entered search term specifies a plurality of values, wherein the plurality of values is to be used for searching a corresponding plurality of hierarchically-adjacent levels which are subordinate to the particular one of the displayed hierarchical levels with which the selected search field is associated;

means for processing the entered search term by successively refining a search for occurrence of the specified plurality of values, wherein the successively refining starts from a top-most one of the hierarchically-adjacent levels and continues downward toward a bottom-most one of the hierarchically adjacent levels, wherein the top-most one is the hierarchical level which is subordinate to the particular one of the displayed hierarchical levels with which the selected search field is associated; and means for displaying to the user the hierarchically-adjacent subordinate levels which are located by the means for processing.

11. Computer readable program code for searching a hierarchical information structure and representing results of the searching, comprising:

computer readable program code means for displaying two or more hierarchical levels of the hierarchical information structure on a display device;

computer readable program code means for displaying at least two search fields on the display device, wherein each displayed search field is associated with a particular one of the displayed hierarchical levels;

computer readable program code means for entering, by a user, a search term into a selected one of the displayed search fields, wherein the entered search term specifies a plurality of values, wherein the plurality of values is to be used for searching a corresponding plurality of hierarchically-adjacent levels which are subordinate to the particular one of the displayed hierarchical levels with which the selected search field is associated;

computer readable program code means for processing the entered search term by successively refining a search for occurrence of the specified plurality of values, wherein the successively refining starts from a top-most one of the hierarchically-adjacent levels and continues downward toward a bottom-most one of the hierarchically adjacent levels, wherein the top-most one is the hierarchical level which is subordinate to the particular one of the displayed hierarchical levels with which the selected search field is associated; and computer readable program code means for displaying to the user the hierarchically-adjacent subordinate levels which are located by the computer readable program code means for processing.

\* \* \* \* \*